United States Patent
Partovi Nia et al.

(10) Patent No.: US 12,288,163 B2
(45) Date of Patent: Apr. 29, 2025

(54) TRAINING METHOD FOR QUANTIZING THE WEIGHTS AND INPUTS OF A NEURAL NETWORK

(71) Applicants: Vahid Partovi Nia, Montreal (CA); Ryan Razani, Toronto (CA)

(72) Inventors: Vahid Partovi Nia, Montreal (CA); Ryan Razani, Toronto (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 987 days.

(21) Appl. No.: 17/031,817

(22) Filed: Sep. 24, 2020

(65) Prior Publication Data
US 2021/0089925 A1  Mar. 25, 2021

Related U.S. Application Data

(60) Provisional application No. 62/905,257, filed on Sep. 24, 2019.

(51) Int. Cl.
*G06N 3/084* (2023.01)
*G06N 3/048* (2023.01)

(52) U.S. Cl.
CPC ............. *G06N 3/084* (2013.01); *G06N 3/048* (2023.01)

(58) Field of Classification Search
CPC ........ G06N 3/045; G06N 3/048; G06N 3/063; G06N 3/084
See application file for complete search history.

(56) References Cited

U.S. PATENT DOCUMENTS

2021/0295114 A1* 9/2021 Ye .................. G06F 16/5846

OTHER PUBLICATIONS

Ardakani et al., "Learning Recurrent Binary/Ternary Weights", Jan. 24, 2019, arXiv:1809.11086v2, pp. 1-19. (Year: 2019).*
Choi et al., "Learning Low Precision Deep Neural Networks through Regularization", Sep. 1, 2018, arXiv:1809.00095v1, pp. 1-10. (Year: 2018).*
Ian J. Goodfellow, Yoshua Bengio, and Aaron C. Courville. Deep Learning. Adaptive computation and machine learning. MIT Press 2016.

(Continued)

*Primary Examiner* — Brent Johnston Hoover

(57) ABSTRACT

A method and processing unit for training a neural network to selectively quantize weights of a filter of the neural network as either binary weights or ternary weights. A plurality of training iterations a performed that each comprise: quantizing a set of real-valued weights of a filter to generate a corresponding set of quantized weights; generating an output feature tensor based on matrix multiplication of an input feature tensor and the set of quantized weights; computing, based on the output feature tensor, a loss based on a regularization function that is configured to move the loss towards a minimum value when either: (i) the quantized weights move towards binary weights, or (ii) the quantized weights move towards a ternary weights; computing a gradient with an objective of minimizing the loss; updating the real-valued weights based on the computed gradient. When the training iterations are complete, a set of weights quantized from the updated real-valued weights is stored as either a set of binary weights or a set of ternary weights.

17 Claims, 10 Drawing Sheets

(56) References Cited

OTHER PUBLICATIONS

Alex Krizhevsky, Ilya Sutskever, and Geoffrey E. Hinton. Imagenet classification with deep convolutional neural networks. Commun. ACM, 60(6) 2017.

Karen Simonyan and Andrew Zisserman. Very deep convolutional networks for large-scale image recognition. CoRR, abs/1409.1556 2014.

Christian Szegedy, Wei Liu, Yangqing Jia, Pierre Sermanet, Scott E. Reed, Dragomir Anguelov, Dumitru Erhan, Vincent Vanhoucke, and Andrew Rabinovich. Going deeper with convolutions. In Conference on Computer Vision and Pattern Recognition (CVPR 2015.

Joseph Redmon, Santosh Kumar Divvala, Ross B. Girshick, and Ali Farhadi. You only look once: Unified, real-time object detection. CoRR, abs/1506.02640 2015.

Wei Liu, Dragomir Anguelov, Dumitru Erhan, Christian Szegedy, Scott E. Reed, Cheng-Yang Fu, and Alexander C. Berg. SSD: single shot multibox detector. CoRR, abs/1512.02325 2015.

Shaoqing Ren, Kaiming He, Ross B. Girshick, and Jian Sun. Faster R-CNN: towards real-time object detection with region proposal networks. CoRR, abs/1506.01497 2015.

Matthieu Courbariaux, Yoshua Bengio, and Jean-Pierre David. Binaryconnect: Training deep neural networks with binary weights during propagations. In Advances in neural information processing systems (NIPS) 2015.

Itay Hubara, Matthieu Courbariaux, Daniel Soudry, Ran El-Yaniv, and Yoshua Bengio. Binarized neural networks. In Advances in neural information processing systems (NIPS) 2016.

Mohammad Rastegari, Vicente Ordonez, Joseph Redmon, and Ali Farhadi. Xnor-net: Imagenet classification using binary convolutional neural networks. CoRR, abs/1603.05279 2016.

Shuchang Zhou, Zekun Ni, Xinyu Zhou, He Wen, Yuxin Wu, and Yuheng Zou. Dorefa-net: Training low bitwidth convolutional neural networks with low bitwidth gradients. CoRR, abs/1606.06160 2016.

Xiaofan Lin, Cong Zhao, and Wei Pan. Towards accurate binary convolutional neural network. In Advances in neural information processing systems (NIPS) 2017.

Zhouhan Lin, Matthieu Courbariaux, Roland Memisevic, and Yoshua Bengio. Neural networks with few multipli-cations. CoRR, abs/1510.03009 2015.

Fengfu Li and Bin Liu. Ternary weight networks. CoRR, abs/1605.04711 2016.

Chenzhuo Zhu, Song Han, Huizi Mao, and William J. Dally. Trained ternary quantization. CoRR, abs/1612.01064 2016.

Mouloud Belbahri, Eyyüb Sari, Sajad Darabi, and Vahid Partovi Nia. Foothill: A quasiconvex regularization for edge computing of deep neural networks. In Image Analysis and Recognition—16th International Conference (ICIAR) 2019.

Yann LeCun, Leon Bottou, Yoshua Bengio, and Patrick Haffner. Gradient-based learning applied to document recognition. Proceedings of the IEEE, 86(11) Nov. 1998.

Alex Krizhevsky and Geoffrey Hinton. Learning multiple layers of features from tiny images. Technical report, Citeseer 2009.

Forrest N. Iandola, Song Han , Matthew W. Moskewicz , Khalid Ashraf , William J. Dally, Kurt Keutzer; Squeezenet: Alexnet-Level Accuracy With 50X Fewer Parameters and <0.5MB Model Size, arXiv:1602.07360v4 Nov. 4, 2016.

Song Han, Huizi Mao, William J. Dally; Deep Compression: Compressing Deep Neural Networks With Pruning, Trained Quantization and Huffman Coding, arXiv:1510.00149v5 Feb. 15, 2016.

Morin et al:"Smart Ternary Quantization",Sep. 25, 2019, total 8 pages.

* cited by examiner

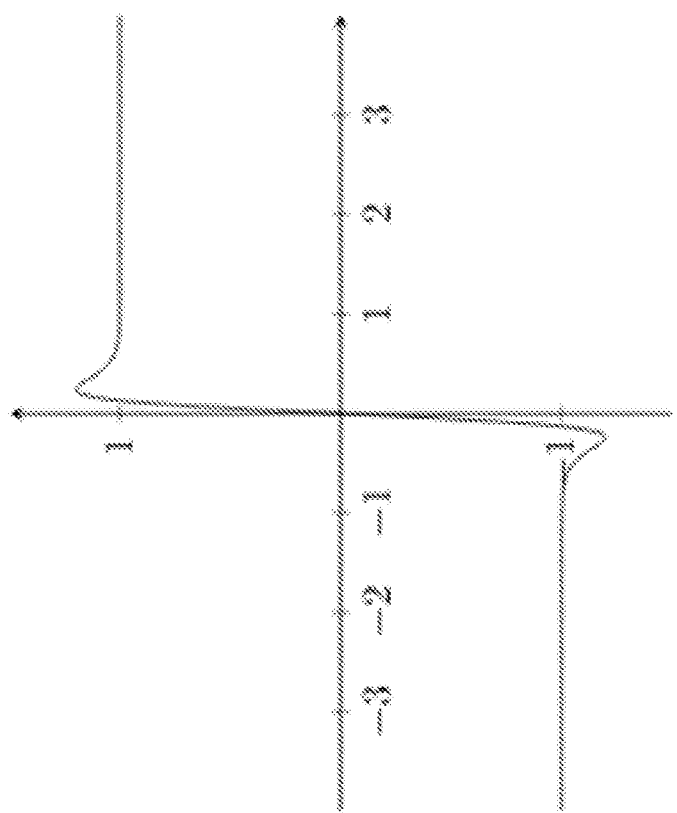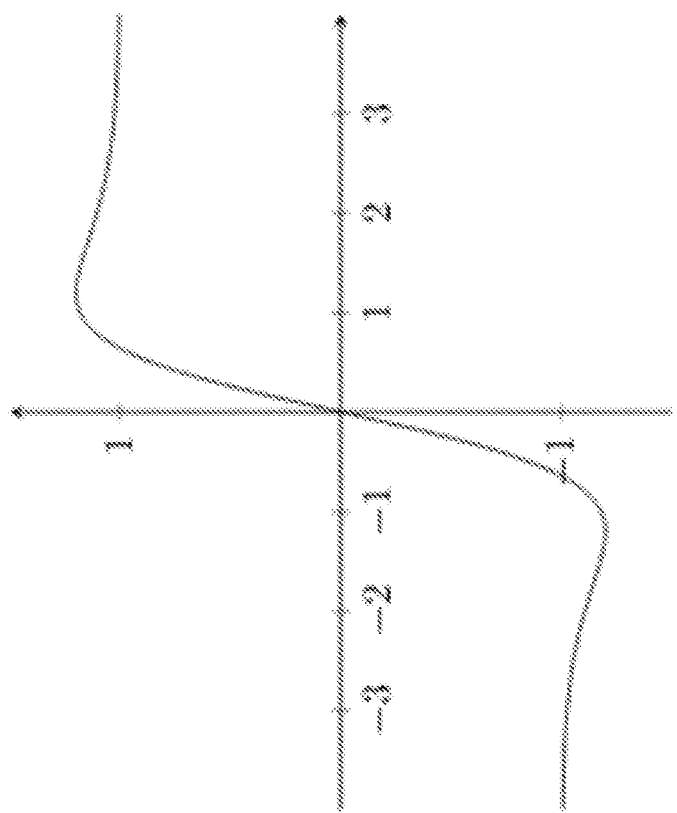
FIG. 6

TRAINING METHOD FOR QUANTIZING THE WEIGHTS AND INPUTS OF A NEURAL NETWORK

CROSS-REFERENCE TO RELATED APPLICATIONS

This application claims priority to and the benefit of U.S. Provisional Patent Application Ser. No. 62/905,257 filed Sep. 24, 2019, "A SMART TRAINING METHOD FOR QUANTIZING THE WEIGHTS AND ACTIVATION FUNCTIONS OF A DEEP NEURAL NETWORK", the contents of which are incorporated herein.

FIELD

This disclosure relates generally to artificial neural networks. More particularly, the present application relates to neural networks that comprise computational blocks having quantized inputs and parameters, and methods of training such neural networks.

BACKGROUND OF THE INVENTION

Artificial neural networks (NNs) are computing systems that are modeled on how biological brains operate. NNs are made up of a number of layers (e.g., computational blocks) that each include a plurality of computational units (called neurons), with connections among computational units of different layers. Each computational unit (e.g., each neuron) in a NN transforms data using a series of computations that include each respective computational unit multiplying an initial value by some weight, summing the results with other values coming into the same respective computational unit, adjusting the resulting number by the respective bias of the computational unit, and then normalizing the output with an activation function. The bias is a number which adjusts the value of a respective computational unit once all the connections are processed, and the activation function ensures values that are passed on to a subsequent computational unit within a tunable, expected range. The series of computations is repeated until a final output layer of the NN generates scores or predictions related to a particular task. NNs can learn to perform tasks, such as object detection, image classification, clustering, voice recognition, or pattern recognition. NNs typically do not need to be programmed with any task-specific rules. Instead, NNs generally perform supervised learning, building knowledge from data sets where the right answer is provided in advance. NNs then learn by tuning themselves to find the right answer on their own, increasing the accuracy of their predictions.

NNs have become larger (i.e., deeper) and more complicated. This has inevitably increased the number and size of layers in the NN to the point where it can be costly to implement the NN in software or hardware. NNs increasingly rely on usage of specially designed, computationally powerful hardware devices that include one or more processing units, accelerators (e.g., accelerators designed to perform certain operations of the NN) and supporting memory to perform the operations of each of the layers of the NN (hereinafter referred to generally as NN operations and individually as NN operation). In some examples, a dedicated processing unit, accelerator and supporting memory are packaged in a single integrated circuit. The computationally powerful hardware devices required for executing NN operations of deep NNs come with increased financial cost, as well as ancillary costs in terms of physical space and thermal cooling requirements.

Deep learning models have achieved tremendous attraction due to their success on a wide variety of tasks including Computer Vision, Automatic Speech Recognition, Natural Language Processing, and Reinforcement Learning. More specially, in Computer Vision, deep neural networks (DNNs) have led to a series of breakthrough for object recognition, and object detection. The success of deep learning, to some extent, owes to fast development of computing resources as the models are trained on high-ended graphics processing units (GPUs) or clusters of central processing units (CPUs) (i.e., CPU clusters).

Deep NNs are commonly full precision NN's constructed using full-precision layers that are made up of full-precision computational units. Full-precision layers perform NN operations, such as a matrix multiplication, addition, batch normalization, and multiply-accumulate (MAC) in respect of values that each have more than 8 bits (e.g., the individual elements in a feature tensor such as a input feature vector or feature map are each real values represented using 8 or more bits, and the weights of a neural network layer included in a weight tensor are also real values represented using 8 or more bits). NN operations performed in the context of a full precision layer are referred to as high-bit NN operations. In particular, each element output of a computational unit in a layer of NN (e.g., ith layer of NN) is a weighted sum of all the feature elements input to the computational unit, which requires a large number of multiply-accumulate (MAC) operations per full-precision layer. Accordingly, the high-bit NN operations performed by a full-precision NN layer are computationally intensive and also require large amounts of storage for storing parameters. This places constraints on the use of full-precision NN's in computationally constrained hardware devices where memory or computational resources (i.e. computational resources used to perform NN operations) are limited. When deploying deep learning models to device comprising limited memory and computational resources, such as edge devices, wearable devices, smart watches, autonomous cars, and drones with limited computing power and memory, a computational efficient model is desirable.

Accordingly, there is a growing interest in NN compression techniques that may reduce the number of NN operations required performed by a NN configured for a particular task at inference and thereby enable NNs to be deployed in computationally constrained hardware devices that may for example employ less powerful processing units, less powerful (or no) hardware accelerators, less memory and/or less power than required for deployment of a non-compressed NN. NN compression techniques may for example be applied in cost-effective computationally constrained hardware devices that can be implemented to solve real-world problems in applications such as robotics, autonomous driving, drones, and the internet of things (IOT). Neural network quantization is one NN compression technique being adopted to address the challenge of compressing a trained NN to enable NN operations to be performed by the trained NN on resource-constrained hardware device. Among other things, NN quantization may be used to replace high-bit MAC operations performed at an NN layer with bitwise operations. Because the smallest bit width MAC operator supported by a general-purpose processing unit is an 8-bit MAC operator, conventional quantization techniques reduce full precision matrix multiplication operations to 8-bit matrix multiplication operations for execution by an 8-bit MAC operator. Any NN quantization technique that reduces full precision matrix multiplication operations to matrix multiplication operations having a bit width smaller than 8 bits (i.e., a number of bits less 8 bits) must be performed either by a computational unit using bitwise operators or using a specific hardware device. NN layers that use bitwise operations can be configured as low-bit layers in which operations are performed using elements that are represented as 1 or 2 bit values.

The basic block of a neural network (NN) can be defined as, $$x^{i+1} = \sigma(W^i x^i + b^i)$$

where $x^i$ is the input (e.g., a feature tensor or map) of the block i, $W^i$ is the weight matrix of block i and $b^i$ is the bias vector of block i. Activation function $\sigma(x)$ introduces non-linearity into the iterative linear transformations which allows the NN to approximate non-linear and more complex functions.

A batch normalization operation is often added to a neural network block to improve training and consequently the performance of the NN model (i.e. the model that is approximated by the NN). It can be expressed as, $$BatchNorm(x) = \gamma \frac{x - \mu_B}{\sqrt{\sigma_B^2 + \epsilon}} + \beta$$

where $\mu_B$ is the mini-batch mean of x, $\sigma_B$ is the mini-batch variance of x, $\gamma$ is the trainable scale, $\beta$ is the trainable bias and $\epsilon$ is a very small number to avoid a Divide-By-Zero error.

As known in the art, a convolution neural network is a neural network that includes an input layer, a plurality of convolutional blocks (also known as CNN blocks with each CNN block including convolutional layers that may be interspersed with pooling layers, and a fully connected output layer (also referred to as a full connection NN block). A common CNN block that includes a batch normalization operation can be represented by:

$$x^{i+1} = \sigma(BatchNorm((Conv2D(W^i x^i))))$$

Recently, different NN compression techniques have been proposed to reduce NN model size and computational cost. One such NN compression technique is neural network quantization.

In general, low-bit neural network quantization techniques can generally be classified into two different categories: (i) weight quantization techniques that quantize the real-valued weight tensor received by a NN layer but use real-valued input feature map tensors in the NN operations of the NN layer; and (ii) weight and feature map quantization techniques that quantize both the real-valued weight tensor and the input feature map (also known as "input tensor", "activations" or "activation map") of a NN block.

A typical low-bit CNN block can be expressed as, $$W_q^i = Quantize_W(W^i)$$

$$x_q^i = Quantize_x(x^i)$$

$$x^{i+1} = \sigma(BatchNorm((Conv2D_q(W_q^i \times x_q^i))))$$

where $x^i$ is the input of blocki, $W^i$ is the full-precision weight of blocki, $Quantize_W()$ and $Quantize_x()$ are the quantization functions for quantizing the full-precision weight $W^i$ and the input $x^i$.

Binary quantization represents weights with 1 bit precision and ternary quantization with 2 bits precision. While low-bit NN models (e.g., NN models with low-bit NN blocks) that apply quantization techniques can have significantly reduced memory requirements when compared to full precision NN models (e.g., NN models with full-precision NN-blocks, low-bit NN models are constrained to quantize the network with 1 bit or 2 bits, on demand.

Accordingly, there is need for a low-bit NN models and training methods that can provide quantization flexibility.

SUMMARY

According to a first example aspect is a method of training a neural network to selectively quantize weights of a filter of the neural network as either binary weights or ternary weights. The method includes performing a plurality of training iterations that each comprise: quantizing a set of real-valued weights of a filter to generate a corresponding set of quantized weights; generating an output feature tensor based on matrix multiplication of an input feature tensor and the set of quantized weights; computing, based on the output feature tensor, a loss based on a regularization function that is configured to move the loss towards a minimum value when either: (i) the quantized weights move towards binary weights, or (ii) the quantized weights move towards a ternary weights; computing a gradient with an objective of minimizing the loss; updating the real-valued weights based on the computed gradient. When the training iterations are complete, a set of weights quantized from the updated real-valued weights is stored as either a set of binary weights or a set of ternary weights.

Enabling a neural network to alternatively learn binarized or ternarized weights for a filter may reduce the amount of computational operations required to implement low-bit NN blocks in a trained neural network. The reduction in computational operations may facilitate a trained NN model to be deployed to computationally restrained devices and/or devices that have limited power supplies.

According to some examples of the first aspect, the loss is further based on a difference between one or more values predicted by the NN in respect of an original input feature tensor from a training set and corresponding one or more true values known for the original input feature tensor.

According to some examples of the preceding aspects, the method includes sampling an initial set of real-valued weights from a bimodal distribution to use as the set of real-valued weights for a first iteration of the plurality of iterations.

According to some examples of the first aspect, the regularization function includes a learnable shape parameter, wherein changing a magnitude of the shape parameter in one direction causes the regularization function to approximate a binary regularization function and changing the magnitude of the shape parameter in an opposite direction causes the regularization function to approximate a ternary regularization function.

According to some examples of the first aspect, the matrix multiplication is part of a convolution operation, and the method comprises training a plurality of filters.

According to some examples of the first aspect, the input feature tensor is a binarized input feature tensor.

According to some examples of the first aspect, the method comprises binarizing a real-valued input feature tensor to provide the binarized input feature tensor.

According to some examples of the first aspect, generating the output feature tensor comprises applying an activation function that binarizes an output provided by the matrix multiplication of the input feature tensor and the set of quantized weights.

According to some examples of the first aspect, each element in a set of binary weights has a value of either −1 or +1, and each element in a set of ternary weights has a value of either −1, or 0, or +1.

According to a further example aspect is a processing unit for training a neural network to selectively quantize weights of a filter of the neural network as either binary weights or ternary weights, the processing unit comprising a processor device and a persistent storage coupled to the processing device storing instructions that when executed by the processing device cause the processing unit to: perform a plurality of training iterations that each comprise: quantizing a set of real-valued weights of a filter to generate a corresponding set of quantized weights; generating an output feature tensor based on matrix multiplication of an input feature tensor and the set of quantized weights; computing, based on the output feature tensor, a loss based on a regularization function that is configured to move the loss towards a minimum value when either: (i) the quantized weights move towards binary weights, or (ii) the quantized weights move towards a ternary weights; computing a gradient with an objective of minimizing the loss; updating the real-valued weights based on the computed gradient, when the training iterations are complete, store a set of weights quantized from the updated real-valued weights as either a set of binary weights or a set of ternary weights.

According to a further example aspect is a computer readable medium that persistently stores software instructions for training a neural network to selectively quantize weights of a filter of the neural network as either binary weights or ternary weights, the software instructions including instructions for causing a processing unit to: perform a plurality of training iterations that each comprise: quantizing a set of real-valued weights of a filter to generate a corresponding set of quantized weights; generating an output feature tensor based on matrix multiplication of an input feature tensor and the set of quantized weights; computing, based on the output feature tensor, a loss based on a regularization function that is configured to move the loss towards a minimum value when either: (i) the quantized weights move towards binary weights, or (ii) the quantized weights move towards a ternary weights; computing a gradient with an objective of minimizing the loss; updating the real-valued weights based on the computed gradient, when the training iterations are complete, store a set of weights quantized from the updated real-valued weights as either a set of binary weights or a set of ternary weights.

BRIEF DESCRIPTION OF THE DRAWINGS

Reference will now be made, by way of example, to the accompanying drawings which show example embodiments of the present application, and in which:

FIG. 6 graphically illustrates examples of a feature map quantization function according to example embodiments.

Similar reference numerals may have been used in different figures to denote similar components.

DESCRIPTION OF EXAMPLES EMBODIMENTS

Figure 1:
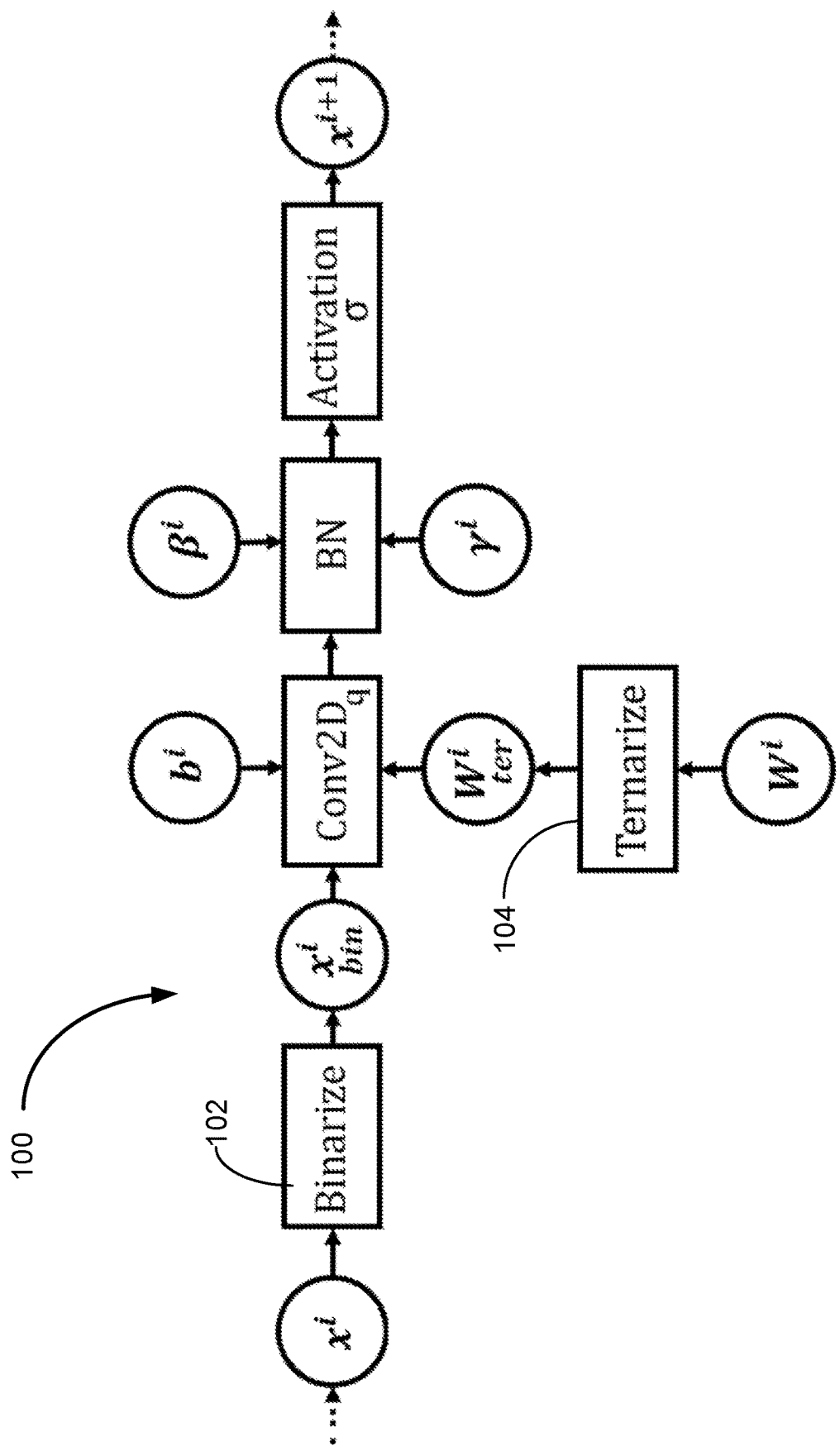
FIG. 1 is a computational graph representation of a CNN block for implementing a layer of a CNN.

The present disclosure relates to a computational training stage CNN block that can be trained to implement either a 1-bit weight parameter quantization or a 2-bit weight parameter quantization, and a method of training a CNN that comprises a plurality of such blocks. In the following disclosure, the learnable weight parameters applied during matrix multiplication at an NN block are referred to as "weights". In example embodiments, during training of the CNN, the weights of each CNN block are automatically quantized into binary (e.g., 1-bit) or ternary (e.g., 2-bit) values depending upon a trainable control parameter.

In a conventional training stage of a binary weight quantized CNN block, the block weights are quantized during the forward pass, by applying a sign function on the real-valued weights, w, as represented by:

$$w^{bin} = \text{sign}(w) = \begin{cases} +1, & w \geq 0 \\ -1, & \text{otherwise} \end{cases}$$

During training a CNN that includes multiple CNN blocks, a loss function for the CNN is computed based on the forward pass output generated using the binary weights. The binarized weight, $w^{bin}$, as determined by the sign function, is discrete (i.e., non differentiable). However, the gradient of the loss function is defined for a neighbourhood. As a result, backpropagation cannot be operated through the sign function as its gradient is zero everywhere. To alleviate this problem, in some backpropagation solutions a straight through estimator is used for the gradient of the sign function. A straight through estimator is a heuristic way of approximating the gradient of a neuron of a neural network, $$\frac{\partial L}{\partial w} = \frac{\partial L}{\partial w^{bin}} 1_{|w| \leq 1}$$

where, L is the loss function and 1 is an indicator function. In other words, the sign function is approximated by a linear function within the range [−1, +1] and a constant elsewhere.

Hence, during backpropagation the gradients are then applied to weights within the range [−1, +1].

In the case of a ternary weight quantized CNN block, the weight resolution may be reduced from 32 bits to 2 bits, by replacing full precision (float) by ternary weights. Full-precision weights can be quantized to ternary weights $w_{ter}$ using two symmetric thresholds $\pm\Delta$ and a scaling factor $\alpha = W_l$ for each layer (or block) l, as, $$w_{ter} = \begin{cases} +W_l, & w > \Delta_l \\ 0, & |w| \le \Delta_l \\ -W_l, & w < -\Delta_l \end{cases}$$

The optimization problem of minimizing the Euclidean $l_2$ distance between full-precision weights w and the ternary weights $w^t$ may be solved using a non-negative scaling factor. As a result, the layer-wise (e.g. block-wise) values of scaling factor $\alpha = W_l$ and thresholds $\pm\Delta$ are obtained by, $$\Delta_l = 0.7E(|w|)$$

where E(.) is an expectation function.

An illustration of this equation is as follows: assume a full-precision 4-element weight vector, w, with a given threshold, $\Delta_l$. The ternary weight $w^t$ can be derived as, $$w=[1.8,-0.03,0,-3.4], \Delta_l=1.5, W_l=3 \to w_{ter}=[3,0,0,-3]$$

During a training stage of a network (including a CNN), backpropagation is used in conjunction with an optimization method such as gradient descent. The gradient of a loss function is calculated with respect to all the weights in the network. The gradient is used it to update the network weights, in an attempt to minimize the loss function.

During backpropagation, gradient values are achieved by calculating the derivatives of the expectations of the Bernoulli distribution which yields the identity function, $$\frac{\partial L}{\partial w} = \frac{\partial L}{\partial w_{ter}}$$

During inference (i.e., during an inference phase), the forward pass can be calculated by transforming the scaling factor by the input as, $$Y = f(Z)$$

where $$Z = X*W \approx X*(\alpha*W^t) = (\alpha*X) \cdot W^t$$

where Y is the output of the activation function feeding to the next layer, and $W^t$ and W are ternary and full precision weights, respectively. The function $f(.)$ refers to a non-linear activation function and operations * and · indicate convolution operation and inner product/convolution operation with no multiplication, respectively.

An illustrative example of the transformation $Z = X*W \approx X*(\alpha*W^t) = (\alpha*X) \cdot W^t$ is shown below:

$$Z = \begin{bmatrix} X11 & X12 \\ X21 & X22 \end{bmatrix} * \begin{bmatrix} 1.8 & 0 \\ -0.03 & -3.4 \end{bmatrix} \approx \begin{bmatrix} X11 & X12 \\ X21 & X22 \end{bmatrix} * \left(3\begin{bmatrix} 1 & 0 \\ 0 & -1 \end{bmatrix}\right) =$$

$$\left(3\begin{bmatrix} X11 & X12 \\ X21 & X22 \end{bmatrix}\right) * \begin{bmatrix} 1 & 0 \\ 0 & -1 \end{bmatrix}$$

A regularization function is often added to the loss function used to train a network. The objective of the regularization function is to mitigate against overfitting and to obtain a model that is generalized to accurately process future data. Standard regularization functions inspire weights to be concentrated about the origin. However, in case of ternary CNN block with ternary valued weights, it is more consistent to have a regularization function that encourages the weights to tend towards $\alpha \times \{-1, 0, +1\}$, with a scaling factor $\alpha > 0$.

The present disclosure describes a symmetric function that can be used to generalize a ternary CNN block so that the CNN block can be trained to apply either binary or ternary quantization to ternary. The present disclosure discloses a regulation function scaling factor $\alpha$ that can be factorized.

Figure 2:
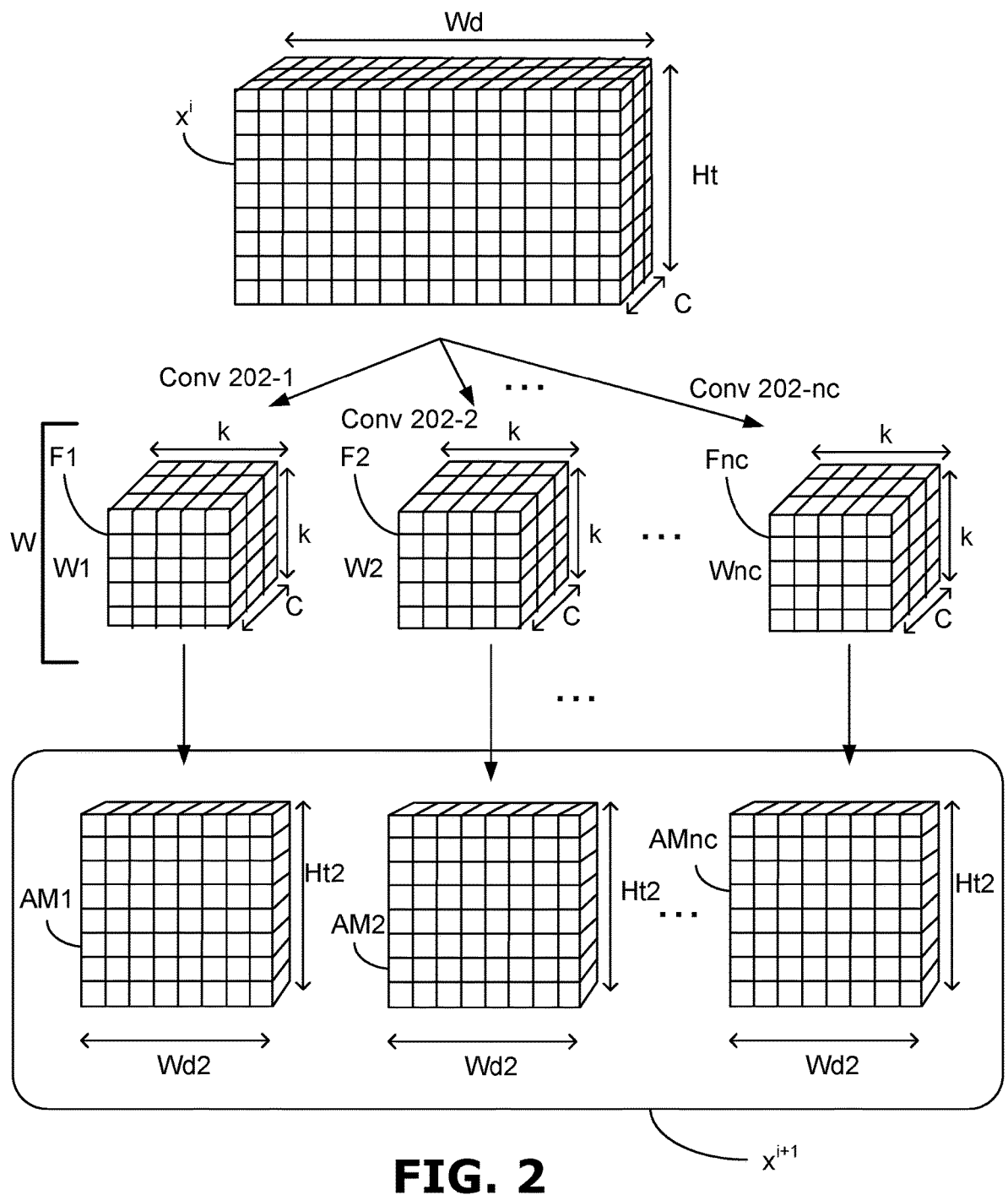
FIG. 2 is a graphic illustration of filters applied by the convolutional layer of the CNN block of FIG. 1.

FIG. 1 illustrates a computational graph of a low-bit CNN block 100 according to an example embodiment. In the illustrated example, CNN block 100 includes both weight and feature map quantization functions (Ternarize function 106 and Binarize function 104, respectively) that quantize both the real-valued weight tensor and the input feature map of the CNN block 100. A neural network may be comprised of several CNN blocks 100, with each CNN block 100 corresponding to a respective CNN layer (including matrix convolution, batch normalization and activation sub-layers or operations) of the neural network. CNN block 100 can be expressed as, $$W_{ter}^i = \text{Ternarize}_W(W^i)$$

$$x_{bin}^i = \text{Binarize}_x(x^i)$$

$$x^{i+1} = \sigma(\text{BatchNorm}((\text{Conv2D}_q(W_q^i x_q^i)))$$

where $x^i$ is the input feature map of $i^{th}$ CNN block 100 (e.g., the $i^{th}$ CNN layer of an NN), $W^i$ is the full-precision weight of blocki, $\text{Ternarize}_W( )$ and $\text{Binarize}_x( )$ are the quantization functions for quantizing the full-precision weight $W^i$ and the input feature tensor $x^i$. In example embodiments, the weights $W_{ter}^i$ configure convolution function $\text{Conv2D}_q$ to convolve the input feature map $x^i$ with a set of nc filters F1 to Fnc. In this regard, FIG. 2 graphically illustrates CNN block 100 as a set of nc parallel convolution operations 202-1 to 202-nc, each of which applies a respective filter F1 to Fnc that is defined by a respective set W1 to Wnc of weights and corresponds to a respective output channel. Each filter F1 to FcN is defined by a respective set of learnable weights W1 to Wnc, which collectively are weights $W_{ter}^i$. "j" is used to denote a generic output channel of the where $1 \le j \le nc$. Referring to FIG. 2, in the example of an image, the input feature map $x^i$ of CNN block 100 is a Wd×Ht×C feature map, with C being the number of input channels, Wd the width of the feature map input and Ht the height of the feature map (in some examples Wd=Ht). For a given filter F1 to Fnc, the input (e.g. filter field of view) is a 3D tensor of size k×k×C, with k being the kernel size. During training of block 200, each respective filter Fj is convolved, using a defined stride length, over the input feature map $x^i$ by taking a respective portion of size k×k×C from the input feature map $x^i$ and multiplying it by the filter Fj (e.g. the set of k×k×C filter weights Wj) in an element-wise manner. All the values output from the filter Fj for a respective portion of size k×k×C are summed to get one scalar at the end, and the filter Fj is convolved over C×k×k portions of the input tensor using a defined stride to generate a channel-specific map AMj of scaler values. In the illustrated example, each channel-specific map AMj is a Wd2× Ht2×1 map, which is subjected to batch normalization and activation operations, collectively resulting in a Wd2×Ht2× nc output feature map $x^{i+1}$ for CNN block 100.

Thus, the NN block 100 may include one or more convolution operations (e.g., conv 202-1 to conv 202-nc), each associated with a respective filter F1 to Fnc. Each filter Fj includes a plurality of weights Wj.

A regularization function $R_t(w, \alpha_j, \beta_j, p=1)$ for a single filter Fj of ternary weight CNN block 100 can be generalized as a piecewise function as indicated below (Equation 1). In the present case, w denotes the weight matrix Wj corresponding to the $j^{th}$ filter Fj of the $i^{th}$ CNN block (e.g., $i^{th}$ layer) of a CNN. Weight sparsity for the $i^{th}$ CNN block 100 is controlled by a shape parameter $\beta_j$ (also referred to as a quantization-type parameter). Shape parameter $\beta_j$ indicates an extent to which the weights of filter Fj are pushed towards $\alpha \times \{-1, 0, +1\}$. In example embodiments, the scaling factor $\alpha_j$ is a trainable scaling factor that is trained in respect of each individual filter Fj within CNN block 100. Scaling factor $\alpha_j$ controls the extent to which the weights are pushed away from the y axis (e.g., from a 0 or origin value). Parameter p is an overall shape parameter for the function.

$$R_t(w, \alpha_j, \beta_j, p=1) = \begin{cases} |\beta_j w|, & |w| \leq \frac{1}{\beta_j}, \\ -\frac{w - \alpha_j}{\alpha_j - \frac{1}{\beta_j}}, & \frac{1}{\beta_j} < w \leq \alpha_j, \\ ||w| - \alpha_j| - \alpha_j|, & w \geq \alpha_j, \\ \frac{w + \alpha_j}{\alpha_j - \frac{1}{\beta_j}}, & -\alpha_j \leq w < -\frac{1}{\beta_j}, \\ ||w| - \alpha_j| - \alpha_j|, & w < -\alpha_j, \end{cases} \quad \text{(Eq. 1)}$$

Figure 3A:
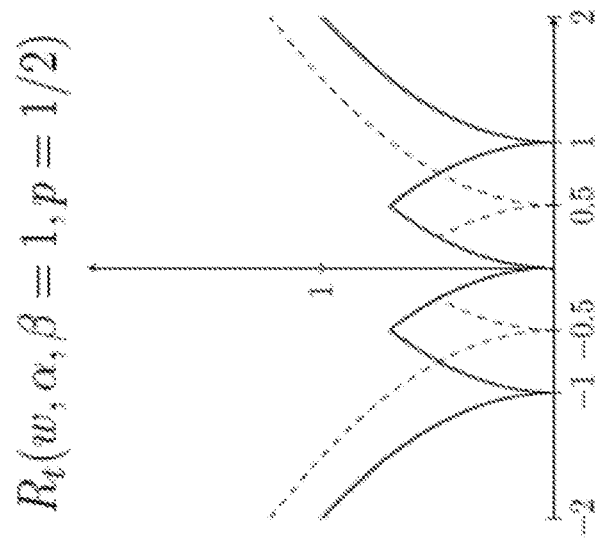
FIGS. 3A, 3B and 3C graphically represent the effect of different regularization functions that employ a low shape parameter value on quantization of weights of a filter of the CNN block.
Figure 3B:
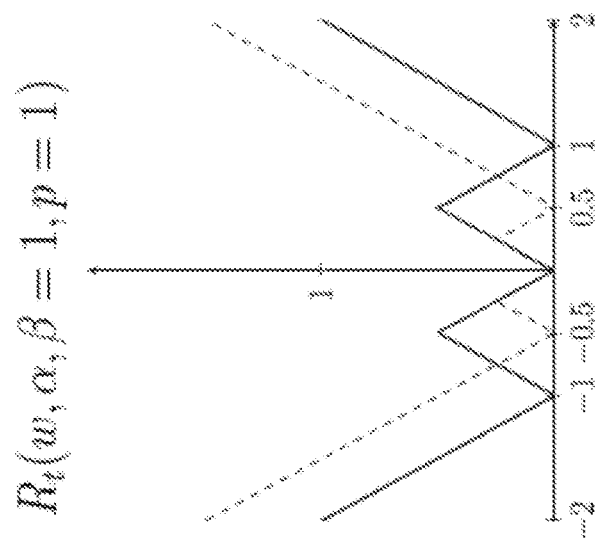
Figure 3C:
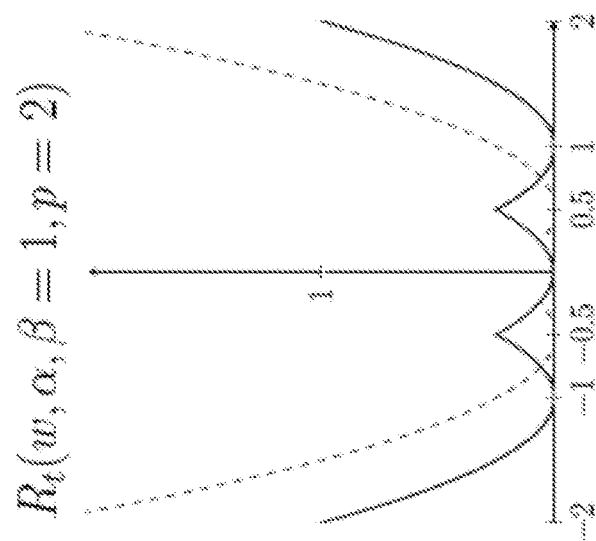

In Equation 1, parameter p is set to 1 to express a special form of regulation function that is similar to the conventional L1 function. In FIGS. 3A, 3B and 3C, three respective versions of regularization functions for a ternary weight CNN block are shown for different values of parameter p (i.e., p=0.5, 1, 2). In each FIGS. 3A, 3B and 3C, the effect of a different scaling factor α is illustrated, where the dashed line and solid line denote Rt(α=0.5) and Rt(α=1), respectively. As depicted in FIGS. 3A, 3B and 3C, in the case of scaling factor α=1, the weights are penalized at varying degrees upon moving away from the objective quantization values, in this case: {-1, 0, 1}.

Figure 4C:
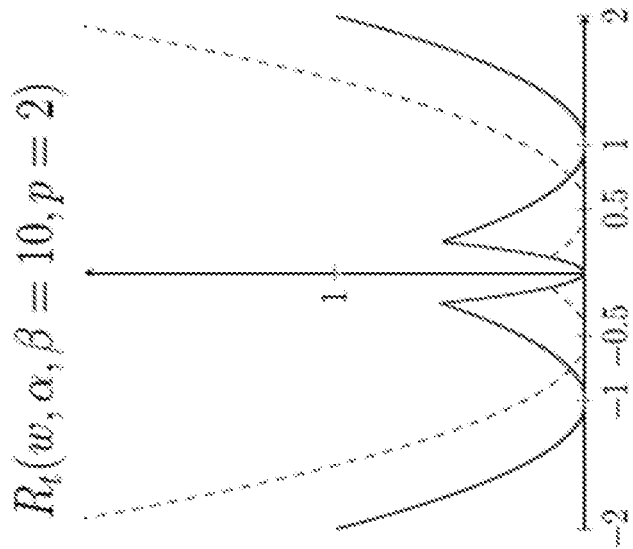
FIGS. 4A, 4B and 4C graphically represent the effect of different regularization functions that employ a high shape parameter value on quantization of weights of a filter of the CNN block.
Figure 4B:
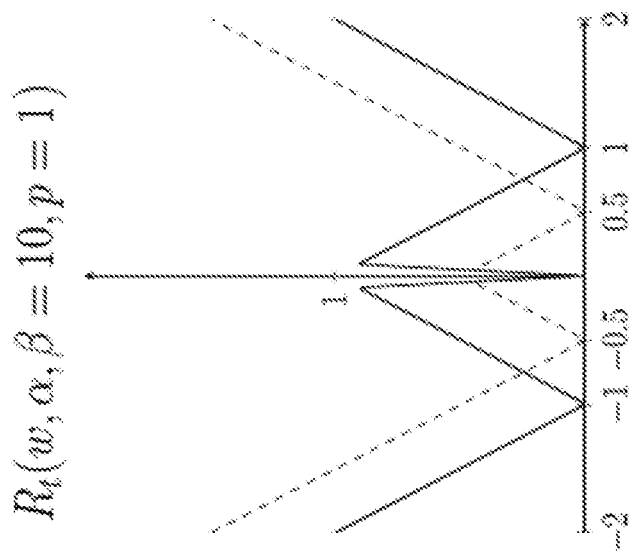
Figure 4A:
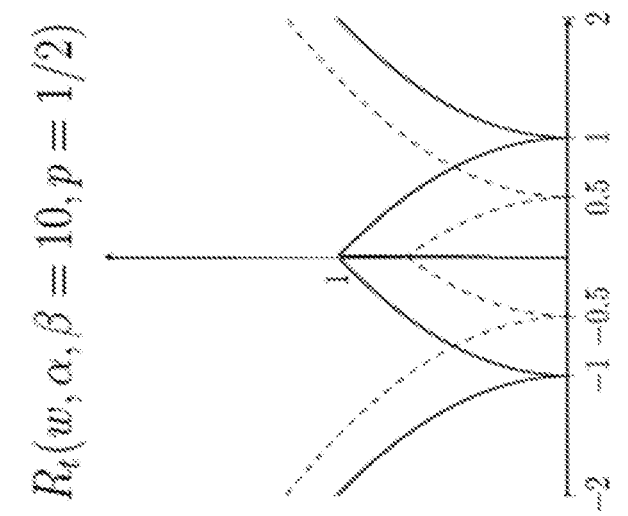

When p=1 or p=2, the regularization forms the shape of the well-known regularization, namely, $L_1$ and $L_2$, respectively. In effect, increasing the shape parameter β to a very large number, results in a regularization function that approximates the binary regularization function. FIGS. 4A, 4B and 4C, illustrates this approximation when β=10 for different values of p=0.5, 1, 2. In each FIGS. 4A, 4B and 4C, the effect of a different scaling factor α is illustrated, where the dashed line and solid line denote Rt(α=0.5) and Rt(α=1), respectively.

The regularization function of Equation 1 can be expressed in simpler terms as shown below (Equation 2), $$R_t(w, \alpha_j, \beta_j, p) = \min(||w| + \alpha_j|^p, ||w| - \alpha_j|^p, \beta_j|w|^p) + \gamma \left|\frac{1}{\beta_j}\right| \quad \text{(Eq. 2)}$$

where γ is a regularization term for shape parameter $\beta_j$.

The regularization function of Equation 2 can be trained over the training stage to achieve a more optimized solution.

Equation 2 can further be modified by leveraging Trigonometric functions. More specifically, the parameters β and 1/β can be replaced by tan(β) and cot(β), respectively, as shown in Equation 3 below. The tan(β) and cot(β) functions have the same curvature, and thus are more numerically stable, as compared to β and 1/β with different curvatures.

$$R_t(w,\alpha_j,\beta_j,p)=\min(||w|+\alpha_j|^p,||w|-\alpha_j|^p,\tan(\beta_j)|w|^p)+\gamma|\cot(\beta_j)| \quad \text{(Eq. 3)}$$

The regularization function $R_t(w, \alpha_j, \beta_j, p)$ is then added to a conventional empirical loss function L(W,b), as per Equation 4:

$$J(W,b)=L(W,b)+\lambda \Sigma_I R_t(w,\alpha_j,\beta_j,p) \quad \text{(Eq. 4)}$$

where $R_t(w, \alpha_j, \beta_j, p)$ is the regularization function for a single filter Fj, and J(W,b) is the total cost function, and I is the total number of filters F in the CNN. Parameters W and b are the sets of all weights and biases in the CNN. Regularization control parameter is denoted by shape parameter $\beta_j$ per filter Fj, and parameter $\alpha_j$ is the scaling factor per filter Fj. Further, λ is a hyper-parameter that controls the effect of the regularization function $R_t(w, \alpha_j, \beta_j, p)$ during each back propagation iteration of the training stage. Shape parameter $\beta_j$ controls the quantization type of each filter Fj (ternary vs binary).

Accordingly, during the training phase, the regularization function $R_t(w, \alpha_j, \beta_j, p)$ will push the weights of a filter F to either a ternary weight quantization or a binary weight quantization. More particularly, increasing the value of the shape parameter β pushes the quantization to a binary 1-bit quantization and decreasing the value of the shape parameter β pushes the quantization to a ternary 2-bit quantization.

In the case of a binary weight quantization, a binary regularization function can be represented as follows in Equation 5:

$$R_b(x,\alpha,p)=||x|-\alpha|^p \quad \text{(Eq. 5)}$$

Figures 5A, 5B, 5C:
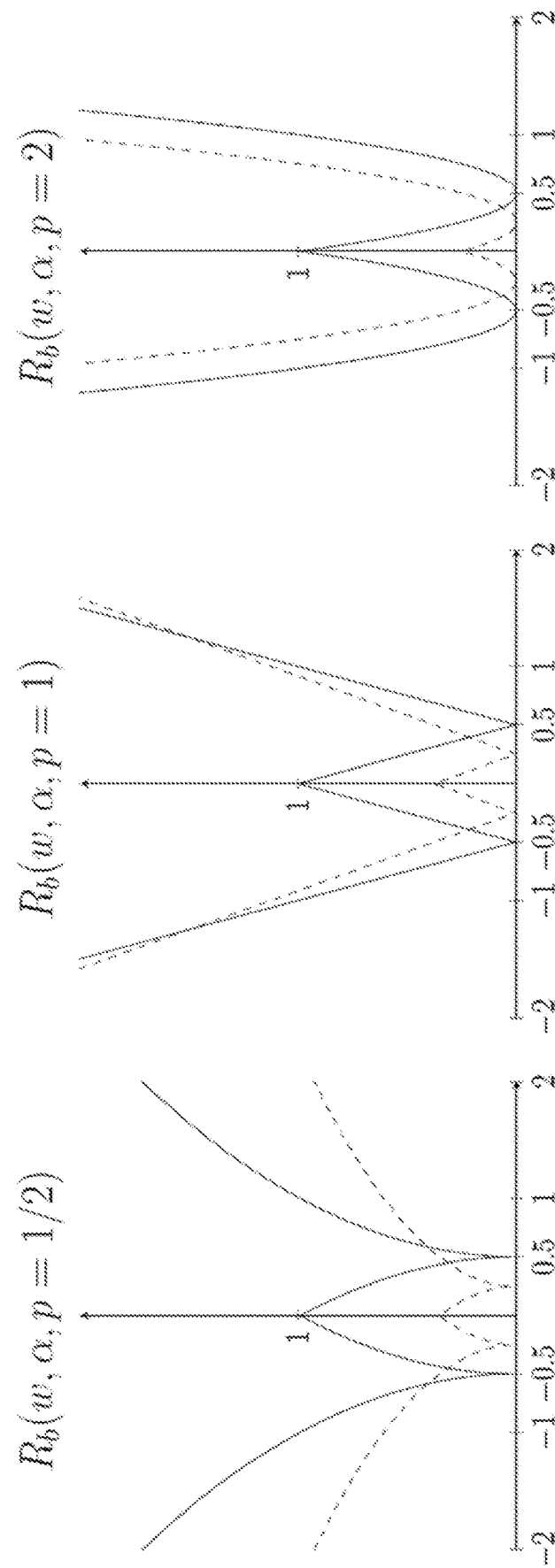
FIGS. 5A, 5B and 5C graphically represent the effect of different regularization functions that correspond to binary quantization of weights.

As shown in FIG. 5, in the case of α=1 the weights are penalized at varying degrees upon moving away from the objective quantization values, in this case: {-1,1}. In FIGS. 5A, 5B and 5C, regularization functions for binary weight quantization regulation function $R_b$, are illustrated, with two scaling factors where the dashed line and solid line denote Rb(α=0.5) and Rb(α=1), respectively, for a) parameter p=½ (FIG. 5A), b) p=1 (FIG. 5B), and c) p=2 (FIG. 5C).

As noted in FIG. 1, in example embodiments the real-valued input feature map $x^i$ to CNN block 100 is quantized by Binarize function 102. As noted above, a sign( ) function can be used as binarize function. However, the sign( ) function is not differentiable. Accordingly, in example embodiments a Sign SWISH (SSWISH) function can be used to quantize the real-values elements of input feature map $x^i$ into 1-bit elements. An approximation of the derivative of the SSWISH function can be trained jointly with the CNN. The SSWISH function can be expressed as indicated in Equation 6:

$$a_\beta(x)=2\sigma(\beta x)[1+\beta x(1-\sigma(\beta x))]-1 \quad \text{(Eq. 6)}$$

where σ( ) is the sigmoid function and the scale β>0 controls how fast a feature map element asymptotes to −1 and 1. FIG. 6 illustrates an example if a SSWISH function for β=2 (left) and β=1 (right).

In example embodiments, the SSWISH function is used to implement activation function σ. In such cases, the output of CNN block 100 will be a binary feature map and it is not necessary to include a binaries function 102 at the front end of the next CNN block 100 in the CNN as the input feature map for that block will already by binarized. Accordingly, in such a CNN, a binarize function 102 is only required at the first CNN block 100 in a series of CNN blocks 100.

Initialization of a CNN that incorporates CNN block 100 will now be described according to an example embodiment. Generally, when considering initialization parameters, the following should be considered. In a forward pass, it is desirable to maintain a similar variance between the input feature map x' and output feature map $x^{i-1}$ for all of the CNN blocks of the CNN. Also, in a backward pass, the variance of the gradients should be remain the same across the CNN blocks of the CNN, so that the gradients do not vanish nor explode prematurely. For training a ternary weight neural network, it is more consistent to initialize the neural network with bimodal distribution to encourage the weights to be pushed away from the ternary threshold and thus learn the ternary weights effectively.

Figure 7:
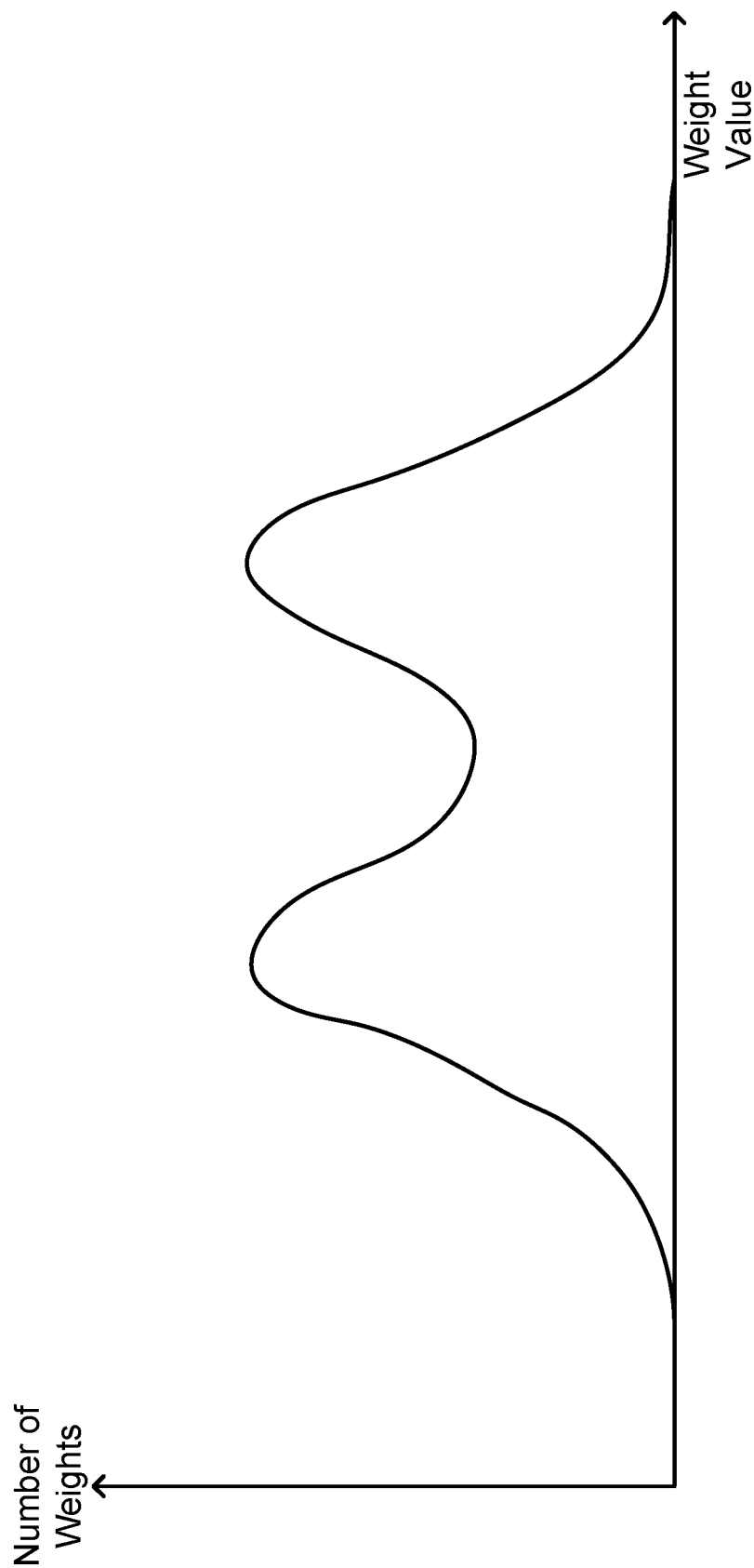
FIG. 7 graphically illustrates an example of a bimodal distribution for the initialization weights for a CNN block according to a further example embodiment.

By way of illustration, suppose the weights w are sampled from bimodal distribution with zero mean, $\mu=0$ and variance $Var=\sigma_w^2$. Assuming that the bimodal weights are independent and weights are sampled from normal distribution as, $W_1 \sim N(-1, \sigma_{w1}^2)$ and $W_2 \sim N(-1, \sigma_{w2}^2)$. Therefore, $W=\frac{1}{2}(W_1+W_2)$ is a bimodal distribution with mean $\mu=0$ and variance of $\sigma_w^2=\frac{1}{4}\sigma_1^2+\frac{1}{4}\sigma_2^2$. According to the known Glorot and Bengio initialization method, for the case of Relu activation the variance is calculated as, $$\sigma_1^2 = \sigma_2^2 = \frac{8}{n_{in} + n_{out}}$$

where $n_{in}$ and $n_{out}$ are the number of connections of the next layer to previous layer, respectively. FIG. 7 illustrates such a bimodal distribution for initializing the weights of a smart ternary network.

As noted above, CNNs are composed of different layers of convolution, fully-connected, activation, and max-pooling layers. Ternarization and Binarization allows bit-wise operations to be used in place of multiply and accumulate operations. The computational complexity of neural networks is heavily dependent on the multiplication operations of the convolution and fully-connected layers. Both layers can be considered as several dot products between input features and weight parameters. The dot product of these tensors can be efficiently implemented by bit-wise operation followed by a Popcount operation.

In a low-bit CNN that ternarizes weights and binarizes input feature map elements, the weights and input feature map elements are constrained to ternary states of $\{-1, 0, +1\}$ and binary states of $\{-1, +1\}$. This is similar to binary weights but with sparsity due to the existence of zero state. When both the quantized feature map elements and the weights are zero, a forward pass computation is not necessary. In at least some scenarios, this can provide an advantage of reducing power consumption by requiring fewer computation resources.

Accordingly, in example embodiments, during a training stage, a CNN that includes one or mode CNN blocks 100 is trained, based on the regularization function, to switch between either binary or ternary quantization of the weights that are applied to a filter. In example embodiments, an optimized weight quantization function (e.g. binary or ternary) is effectively learned for each respective filter. In some alternative examples, rather than on a filter-by-filter basis, the weight quantization function may be learned on a block-by-block (e.g., layer by layer) basis, with all filters of a block or layer applying the same quantization function.

After training is completed, during the inference stage, only the learned Binary or Ternary values of the weights are required for implementing the inference-stage CNN model.

Conventionally, low-bit weight quantized DNNs have suffered from a drastic drop in accuracy when compared to full precision counterparts, and this problem has been exacerbated when the input feature map is also quantized. This problem is largely due to noise and lack of precision in the training objective of the DNN during back-propagation. Although, quantizing the weights and input feature maps has been attracting large interest due to the resulting computational efficiencies, closing the gap between the accuracy of full precision DNNs and their low-bit quantized versions has remained a challenge. Weight quantizing can result in a drastic loss of information, making a DNN harder to train due to large number of sign fluctuations in the weights. Accordingly, it is desirable to control the stability of quantized training methods. Back-propagation is in the quantized network setting can be infeasible as approximations are made using discrete functions. Instead, heuristics and reasonable approximations must be made to match the forward and backward passes in order to result in meaningful training. Often weights at different layers/blocks in the DNN follow a certain structure. Training these weights locally, and maintaining a global structure to minimize a common cost function is desirable.

The methods and systems presented in this disclosure may mitigate against one or more of these challenges and issues faced by existing quantization solutions. Example embodiments relate to a method which reduces the computational complexity of 2-bit CNNs. The regularization function $R_t(w, \alpha_j, \beta_j, p)$ described above can, in at least some applications, efficiently produce either binary or ternary weights. The reduction in bit-width can benefit hardware accelerators such as neural network chips and FPGAs. The presently disclosed embodiments may, in some applications, provide a robust CNN model with increased predictive accuracy relative to existing low-bit solutions, thereby reducing the performance gap between full precision CNNs and low-bit quantized CNNs. The scaling factor $\alpha_j$ is embedded in the regularization function and is flexible to be either binary or ternary numbers. The bimodal weight initialization described above is consistent with 2-bit quantization and configured to encourage the weights to be pushed away from the ternary thresholds and effectively form ternary or binary weights. The input feature map quantization function reduces the gradient mismatch.

In example embodiments, the regularization function $R_t(w, \alpha_j, \beta_j, p)$ may contribute to stability when training a DNN and enable the DNN to maintain a global structure. Unlike conventional regularization functions that shrink the weights to 0, in the context of a binary neural network, the goal of regularization function $R_t(w, \alpha_j, \beta_j, p)$ is to selectively guide the weights towards the values $-1$ and $+1$ (in the case of a high shape factor value, e.g., $\beta_j=10^9$) or to guide the weights towards the values $-1$, $0$, and $+1$ (in the case of a low shape factor value e.g., $\beta_j=0.1$), thereby providing a general regularization function is defined which makes it possible to maintain this coherence. Changing the shape parameter $\beta_j$ influences the weight distribution and controls the sparsity of the weights of a filter Fj.

As noted above, the regularization function $R_t(w, \alpha_j, \beta_j, p)$ includes filter specific scaling factor $\alpha_j$. Hence, the scaling factor values are learned during back-propagation. Moreover, the value of these scaling factors can be constrained in a form of $2^N$ in order to achieve speedup in inference.

As noted above, DNNs suffer from vanishing and exploding gradients. A partial solution to this, is a random or more careful choice of initialization of the parameters of a network. Moreover, initialization of the parameters of a network helps to train a model more quickly. Accordingly, as described above, in example embodiments, the CNN blocks of a CNN are initialized with a bimodal weight distribution to encourage the weights to be pushed away from the ternary threshold and effectively form ternary or binary weights.

Figure 8:
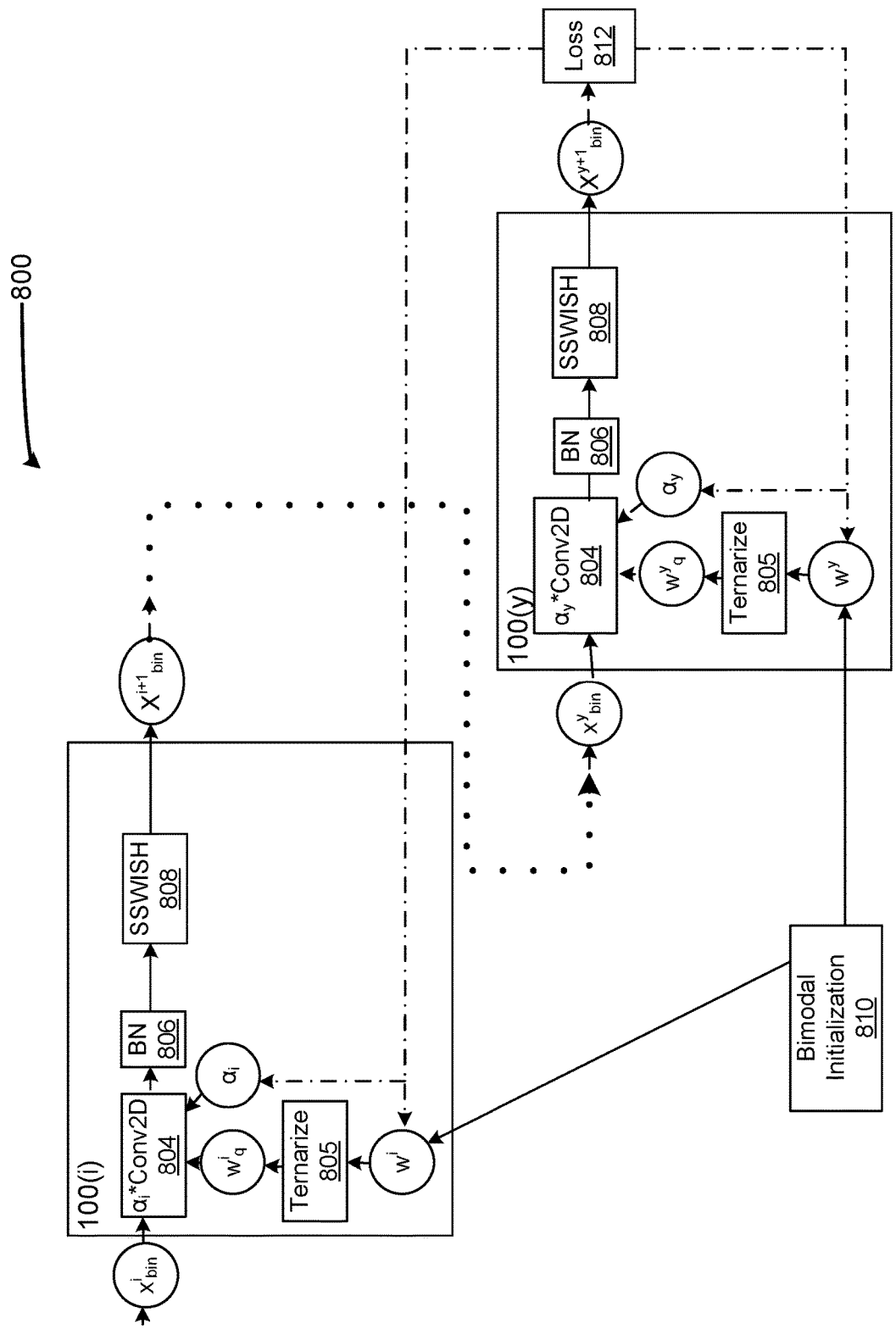
FIG. 8 is a computational graph representation of a CNN block for implementing a layer of a CNN.
Figure 9:
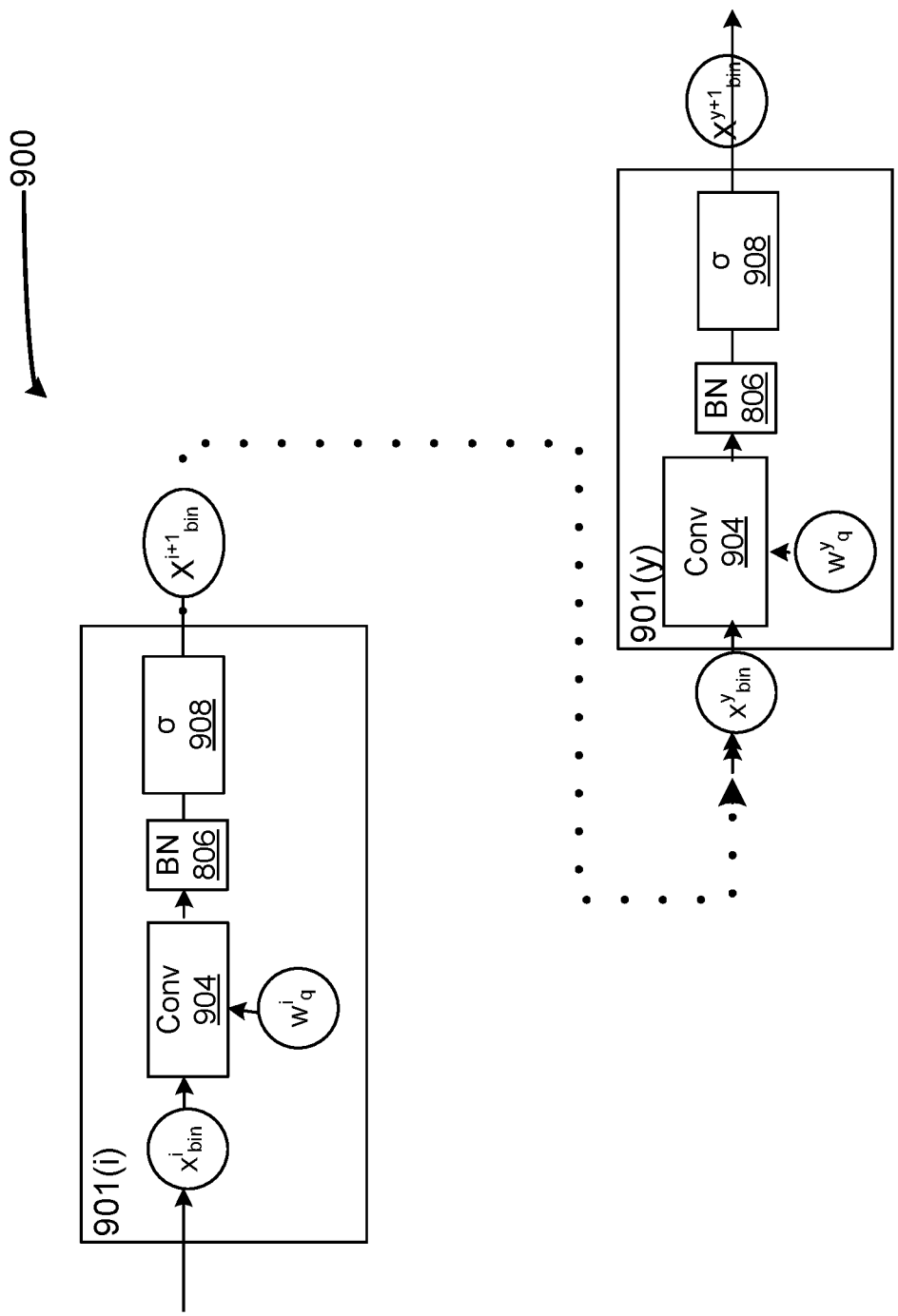
FIG. 9 is pseudo code representing training of a CNN according to an example embodiment.

FIG. 8 is a computational block diagram illustrating a computational graph of a training CNN 800 that includes multiple layers implemented using CNN blocks similar to block 100 described above, except that in addition to being used in the regularization function, the per-filter scaling factor $\alpha$ is also multiplied with the filter output of the convolution operation Conv2D 804. FIG. 8 shows an $i^{th}$ CNN block 100($i$) and a $y^{th}$ CNN block 100($y$), which may be separated by intervening CNN blocks and pooling layers. For the sake of simplicity, in FIG. 8 each CNN block will be described in the context of a single channel block that only includes a single filter per block. In FIG. 8, the activation operation 808 in each block 100($i$), . . . , 100($y$) is performed by an SSWISH function that generates a binary feature map. Accordingly, a stand-alone binarize function is only required for the feature map input to the first CNN block 100(1) (not shown) in the CNN 800

According to an example embodiment, training of the CNN 800 involves the following actions.

Step 1: As an initialization step, a bimodal initialization operation 810 is performed to generate a bimodal sampling of a normal distribution of weights to provide a bimodal distribution for the CNN initiation weights $W_{int}$. In an example embodiment, bimodal weights are sampled from a normal distribution as $W_1 \sim N(-1, \sigma_{W1}^2)$ and $W_2 \sim N(-1, \sigma_{W2}^2)$, such that $W=\frac{1}{2}(W_1+W_2)$ is a bimodal distribution with mean $\mu=0$ and variance of $\sigma_w^2=\frac{1}{4}\sigma_1^2+\frac{1}{4}\sigma_2^2$. Sets of weights $w^i, \ldots, w^y$ are sampled from bimodal CNN initiation weights $W_{int}$ as the initialization weights for each of the CNN blocks 100($i$), . . . , 100($y$), respectively.

Step 2: At each of the CNN blocks 100($i$), . . . , 100($y$), the real-valued weights $w^i, \ldots, w^y$ are quantized by a respective ternarize function 805 to provide quantized weights $w_q^i, \ldots, w_q^y$. In a first iteration, the weights $w^i, \ldots, w^y$ will be the initialized weights, and in subsequent iterations the weights $w^i, \ldots, w^y$ will be incrementally adjusted based on a gradient value determined in respect of the CNN output of the previous iteration.

Step 3: A batch of training data is taken from a training set. The batch includes one or more real valued feature maps x. The real-valued elements included each input feature map x is quantized to respective 1-bit values by a binarize function, resulting in a corresponding binary feature map $x_{bin}$. In this disclosure feature maps are also referred to as feature tensors.

Step 4: CNN 800 performs a forward pass to process the batch, during which one or more output values (predicted values) are generated for each input feature map. Each batch of feature maps passes through a successive sets of CNN blocks 100, with each block processing a successive version of a feature map that is output by the previous block.

For example, the forward pass processing of a binary feature map $x^i_{bin}$ by CNN block 100($i$) is as follows: The binary feature map $x^i_{bin}$ is provided to a convolution operation (Conv2Dq 804) where it is convolved with quantized weights $w_q^i$ to generate an output map that scaled by learnable scaling factor $\alpha_j$. The scaled output of convolution operation is then subjected to batch normalization operation (BN 806) and activation operation 808 In an example embodiment, the activation operation 808 is performed by a SSWISH function, as represented by Equation 6 above. resulting CNN block 100($i$) output feature map $x^{i+1}_{bin}$, which functions as the input feature map for the next layer or CNN block of CNN 800. The successive processing of and generation of feature maps continues in a similar manner through the blocks of the CNN 800, including block 100($y$). In example embodiments the output feature map of a final CNN block is provided to a fully connected layer (note shown), the output of which is one or more predicted values generated in respect of the original input feature map x to CNN 800.

Step 5: A loss function for the batch is then calculated by a loss function operation 812. In the illustrated example, the loss function is represented by: $J(W,b)=L(W,b)+\lambda\Sigma_j R_t(w, \alpha_j, \beta_j, p)$, where $L(W,b)$ represents a difference between the values predicted by CNN 800 in respect of the original input feature maps from the training set and the true values known for the original input feature maps, and $\Sigma_j R_t(w, \alpha_j, \beta_j, p)$ corresponds to the regularization term described above, and $\lambda$ is a hyper parameter that balances the relative effect of the regularization term.

Step 6: The gradient of the loss function is determined with respect to the CNN's learnable parameters, including weights w, scaling factors $\alpha$, and shape parameters $\beta$.

Step 7: Update the weights/parameters using the gradients during a backwards pass (backwards propagation) with the objective of reducing the value of the loss function.

Step 8: Repeat steps 2-7 until one epoch of the training set is completed.

Step 9: Repeat steps 2-8 for as many epochs required to reach an optimized (e.g., minimum loss) or until a defined maximum number of epochs have been performed.

Step 10: store all learned weights and parameters for CNN 800.

As noted above, regularization function $R_t(w, \alpha_j, \beta_j, p)$ is designed to learn to push the weights $w_j$ for a particular filter Fj either to a set of 1-bit values or to a set of 2-bit values. In the case where, after training the learned weights for a filter are 1-bit values, the convolution operation for that particular filter can be implemented using a low-bit operator.

In example embodiments the learned weights and parameters for CNN 800 can be used to deploy a trained CNN model 900 that can perform forward inference in respect of input data. Inference stage CNN model 900 includes blocks 801($i$), . . . , 801($y$) that correspond to training stage CNN blocks 100($i$) to 100($y$). The filtering operations 904 will respectively apply either the 1-bit weights or 2-bit weights learned during the training of CNN 800. In at least some examples, binary operations can be used in place of matrix multiplication operations to implement filtering operations 904, thereby reducing the computational requirements of the computing device that runs the inference stage CNN model 900.

One possible application of the systems and methods described above is in the context of a CNN-based facial recognition system. Facial recognition is capable of identifying and or verifying a person from an image or a video. Generally, a typical CNN-based facial recognition algorithm includes two parts, feature extractor followed by identity classifier. While, the feature extractor part focuses on extracting high-level features from face images, the identity classifier part aims to identify the face image based on the extracted features. In general, CNN models are leveraged as feature extractor module, which extracts representative and discriminative features from face images. The identity classifier can be any classification algorithm, such as DNN, SVM, and KNN. They determine whether the extracted features from input face image matches any face features already stored in the system. The methods and systems of the present disclosure can be applied when training a CNN model to implement a feature extractor in order to compress the trained CNN model. The methods and systems of the present disclosure may also be used when training NN models as identity classifiers, to encourage these models to converge into a binary or ternary network.

In some embodiments, a deep NN with an input layer, an output layer, and one or more hidden layers between the input layer and the output layer may include one or more training stage computational blocks 100 during a training stage. When the NN is deployed for inference purposes, the one or more training stage computational blocks 100 are replaced with respective inference stage computational blocks 901. The NN may be software-implemented by machine readable instructions that are executed using a processing unit, such as a tensor processing unit or a neural processing unit. Alternatively, the NN may be implemented using software that includes machine readable instructions executed by a dedicated hardware device, such as a compact, energy efficient AI chip (e.g. a microprocessor which is specifically designed to execute NN operations tasks faster, using less power than a conventional microprocessor) that includes a small number of logical gates. In example embodiments the NN is trained using a processing unit that is more powerful than the processing systems on which the trained NN is ultimately deployed for inference operations.

Figure 10:
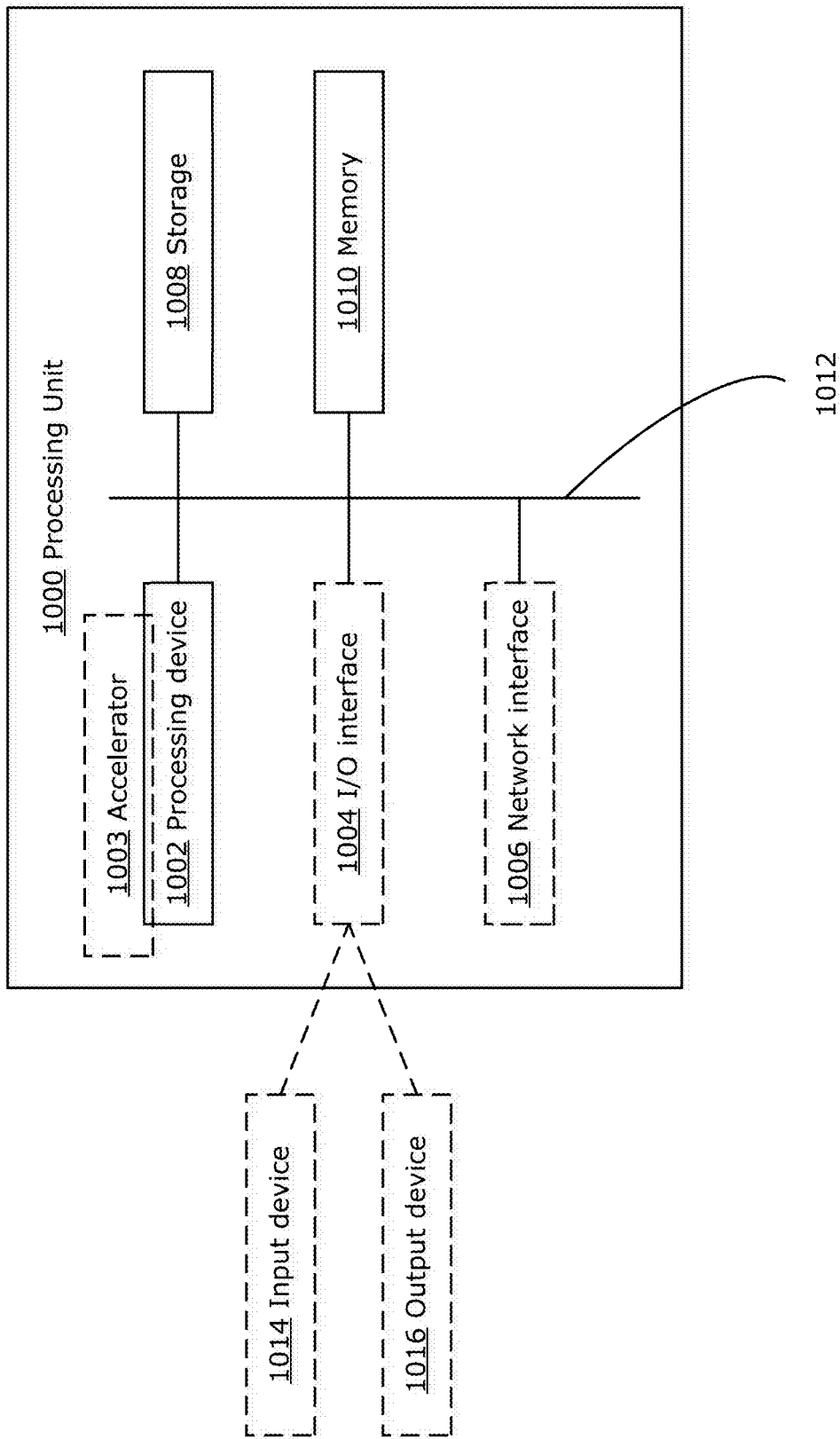
FIG. 10 is a block diagram illustrating an example processing system that may be used to execute machine readable instructions of an artificial neural network that includes the CNN block of FIG. 1.

FIG. 10 is a block diagram of an example hardware device that includes a processing unit 1000, which may during training execute machine executable instructions of a NN that includes one or more training stage computational blocks 100, or during post-training inference to execute machine executable instructions of a trained NN that includes one or more inference stage computational blocks 200. Other processing unit configurations suitable for implementing embodiments described in the present disclosure may be used, which may include components different from those discussed below. Although FIG. 10 shows a single instance of each component, there may be multiple instances of each component in the processing unit 1000.

The processing unit 1000 may include one or more processing devices 1002, such as a processor, a microprocessor, an application-specific integrated circuit (ASIC), a field-programmable gate array (FPGA), a dedicated logic circuitry, or combinations thereof. In example embodiments, a processing unit 1002 that is used for training purposes may include an accelerator 1006 connected to the processing device 1002. The processing unit 1000 may also include one or more input/output (I/O) interfaces 1004, which may enable interfacing with one or more appropriate input devices 1014 and/or output devices 1016. The processing unit 1000 may include one or more network interfaces 1006 for wired or wireless communication with a network (e.g., an intranet, the Internet, a P2P network, a WAN and/or a LAN) or other node. The network interfaces 1006 may include wired links (e.g., Ethernet cable) and/or wireless links (e.g., one or more antennas) for intra-network and/or inter-network communications.

The processing unit 1000 may also include one or more storage units 1008, which may include a mass storage unit such as a solid state drive, a hard disk drive, a magnetic disk drive and/or an optical disk drive. The processing unit 1000 may include one or more memories 1010, which may include a volatile or non-volatile memory (e.g., a flash memory, a random access memory (RAM), and/or a read-only memory (ROM)). The non-transitory memory (ies) 1010 may store instructions for execution by the processing device(s) 1002, such as to carry out examples described in the present disclosure. The memory (ies) 1010 may include other software instructions, such as for implementing an operating system and other applications/functions. In some examples, memory 1010 may include software instructions for execution by the processing device 1002 to implement and train a neural network that includes the bitwise computation block 100 of the present disclosure. In some examples, memory 1010 may include software instructions and data (e.g., weight and threshold parameters) for execution by the processing device 1002 to implement a training stage neural network that includes the computation block 100 of the present disclosure.

In some examples, one or more data sets and/or modules may be provided by an external memory (e.g., an external drive in wired or wireless communication with the processing unit 1000) or may be provided by a transitory or non-transitory computer-readable medium. Examples of non-transitory computer readable media include a RAM, a ROM, an erasable programmable ROM (EPROM), an electrically erasable programmable ROM (EEPROM), a flash memory, a CD-ROM, or other portable memory storage.

There may be a bus 1012 providing communication among components of the processing unit 1000, including the processing device(s) 1002, I/O interface(s) 1004, network interface(s) 1006, storage unit(s) 1008 and/or memory (ies) 1010. The bus 1012 may be any suitable bus architecture including, for example, a memory bus, a peripheral bus or a video bus.

The present disclosure may be embodied in other specific forms without departing from the subject matter of the claims. The described example embodiments are to be considered in all respects as being only illustrative and not restrictive. Selected features from one or more of the above-described embodiments may be combined to create alternative embodiments not explicitly described, features suitable for such combinations being understood within the scope of this disclosure.

All values and sub-ranges within disclosed ranges are also disclosed. Also, although the systems, devices and processes disclosed and shown herein may comprise a specific number of elements/components, the systems, devices and assemblies could be modified to include additional or fewer of such elements/components. For example, although any of the elements/components disclosed may be referenced as being singular, the embodiments disclosed herein could be modified to include a plurality of such elements/components. The subject matter described herein intends to cover and embrace all suitable changes in technology.

In some implementations, the NN block or the NN of the present disclosure may be trained to perform inference tasks in various applications. The inferences tasks may include facial recognition, object detections, image classification, machine translation, or text-to-speech transition.

Although the present disclosure describes methods and processes with steps in a certain order, one or more steps of the methods and processes may be omitted or altered as appropriate. One or more steps may take place in an order other than that in which they are described, as appropriate.

Although the present disclosure is described, at least in part, in terms of methods, a person of ordinary skill in the art will understand that the present disclosure is also directed to the various components for performing at least some of the aspects and features of the described methods, be it by way of hardware components, software or any combination of the two. Accordingly, the technical solution of the present disclosure may be embodied in the form of a software product. A suitable software product may be stored in a pre-recorded storage device or other similar non-volatile or non-transitory computer readable medium, including DVDs, CD-ROMs, USB flash disk, a removable hard disk, or other storage media, for example. The software product includes instructions tangibly stored thereon that enable a processing device (e.g., a personal computer, a server, or a network device) to execute examples of the methods disclosed herein.

The invention claimed is:

1. A computer-implemented method for training a convolutional neural network (CNN) to selectively quantize weights of a filter of the CNN as either binary weights or ternary weights, the method comprising:
performing a plurality of training iterations for training the CNN that each comprise:
quantizing a set of real-valued weights of the filter to generate a corresponding set of quantized weights;
generating an output feature tensor based on matrix multiplication of an input feature tensor and the set of quantized weights;
computing, based on the output feature tensor, a loss based on a regularization function that is configured to move the loss towards a minimum value when either: (i) the quantized weights move towards binary weights, or (ii) the quantized weights move towards ternary weights, wherein the regularization function includes a learnable shape parameter, wherein changing a magnitude of the shape parameter in one direction causes the regularization function to approximate a binary regularization function and changing the magnitude of the shape parameter in an opposite direction causes the regularization function to approximate a ternary regularization function;
computing a gradient with an objective of minimizing the loss; and
backpropagating the loss through the CNN to update values of the real-valued weights based on the computed gradient;
when the training iterations are complete, storing a final set of weights quantized from the updated real-valued weights as either a set of binary weights or a set of ternary weights, the final set of weights representing a learned set of quantized weights; and
deploying the CNN model including the final set of weights to a computationally constrained hardware device, to cause the device to perform forward inference using the CNN model with respect to input data, the CNN model including the final set of weights representing a compressed CNN.

2. The method of claim 1 wherein the loss is further based on a difference between one or more values predicted by the CNN with respect to an original input feature tensor from a training set and corresponding one or more true values known for the original input feature tensor.

3. The method of claim 1 comprising sampling an initial set of real-valued weights from a bimodal distribution to use as the set of real-valued weights for a first iteration of the plurality of iterations.

4. The method of claim 1 wherein the matrix multiplication is part of a convolution operation, and the method comprises training a plurality of filters.

5. The method of claim 1 wherein the input feature tensor is a binarized input feature tensor.

6. The method of claim 5 comprising binarizing a real-valued input feature tensor to provide the binarized input feature tensor.

7. The method of claim 1 wherein generating the output feature tensor comprises applying an activation function that binarizes an output provided by the matrix multiplication of the input feature tensor and the set of quantized weights.

8. The method of claim 1 wherein each element in a set of binary weights has a value of either −1 or +1, and each element in a set of ternary weights has a value of either −1, or 0, or +1.

9. A processing unit for training a convolutional neural network (CNN) to selectively quantize weights of a filter of the CNN as either binary weights or ternary weights, the processing unit comprising a processor device and a persistent storage coupled to the processor device storing instructions that when executed by the processor device cause the processing unit to:
perform a plurality of training iterations for training the CNN that each comprise:
quantizing a set of real-valued weights of the filter to generate a corresponding set of quantized weights;
generating an output feature tensor based on matrix multiplication of an input feature tensor and the set of quantized weights;
computing, based on the output feature tensor, a loss based on a regularization function that is configured to move the loss towards a minimum value when either: (i) the quantized weights move towards binary weights, or (ii) the quantized weights move towards ternary weights, wherein the regularization function includes a learnable shape parameter, wherein changing a magnitude of the shape parameter in one direction causes the regularization function to approximate a binary regularization function and changing the magnitude of the shape parameter in an opposite direction causes the regularization function to approximate a ternary regularization function;
computing a gradient with an objective of minimizing the loss; and
backpropagating the loss through the CNN to update values of the real-valued weights based on the computed gradient;
when the training iterations are complete, store a final set of weights quantized from the updated real-valued weights as either a set of binary weights or a set of ternary weights, the final set of weights representing a learned set of quantized weights; and
deploy the CNN model including the final set of weights to a computationally constrained hardware device, to cause the device to perform forward inference using the CNN model with respect to input data, the CNN model including the final set of weights representing a compressed CNN.

10. The processing unit of claim 9 wherein the loss is further based on a difference between one or more values predicted by the CNN with respect to an original input feature tensor from a training set and corresponding one or more true values known for the original input feature tensor.

11. The processing unit of claim 9 wherein the processing unit is caused to sample an initial set of real-valued weights from a bimodal distribution to use as the set of real-valued weights for a first iteration of the plurality of iterations.

12. The processing unit of claim 9 wherein the matrix multiplication is part of a convolution operation, and the method comprises training a plurality of filters.

13. The processing unit of claim 9 wherein the input feature tensor is a binarized input feature tensor.

14. The processing unit of claim 13 wherein the processing unit is caused to binarize a real-valued input feature tensor to provide the binarized input feature tensor.

15. The processing unit of claim 9 wherein generating the output feature tensor comprises applying an activation function that binarizes an output provided by the matrix multiplication of the input feature tensor and the set of quantized weights.

16. The processing unit of claim 9 wherein each element in a set of binary weights has a value of either −1 or +1, and each element in a set of ternary weights has a value of either −1, or 0, or +1.

17. A non-transitory computer readable medium that persistently stores software instructions for training a convolutional neural network (CNN) to selectively quantize weights of a filter of the CNN as either binary weights or ternary weights, the software instructions including instructions for causing a processing unit to:
   perform a plurality of training iterations for training the CNN that each comprise:
      quantizing a set of real-valued weights of the filter to generate a corresponding set of quantized weights;
      generating an output feature tensor based on matrix multiplication of an input feature tensor and the set of quantized weights;
      computing, based on the output feature tensor, a loss based on a regularization function that is configured to move the loss towards a minimum value when either: (i) the quantized weights move towards binary weights, or (ii) the quantized weights move towards ternary weights, wherein the regularization function includes a learnable shape parameter, wherein changing a magnitude of the shape parameter in one direction causes the regularization function to approximate a binary regularization function and changing the magnitude of the shape parameter in an opposite direction causes the regularization function to approximate a ternary regularization function;
      computing a gradient with an objective of minimizing the loss; and
      backpropagating the loss through the CNN to update values of updating the real-valued weights based on the computed gradient;
   when the training iterations are complete, store a final set of weights quantized from the updated real-valued weights as either a set of binary weights or a set of ternary weights, the final set of weights representing a learned set of quantized weights; and
   deploy the CNN model including the final set of weights to a computationally constrained hardware device, to cause the device to perform forward inference using the CNN model with respect to input data, the CNN model including the final set of weights representing a compressed CNN.

* * * * *